Feb. 14, 1950     L. R. DENNY     2,497,440

HAND TRUCK

Filed June 7, 1946     2 Sheets-Sheet 1

INVENTOR *Leo R. Denny*

Feb. 14, 1950     L. R. DENNY     2,497,440
HAND TRUCK

Filed June 7, 1946     2 Sheets-Sheet 2

INVENTOR *L. R. Denny*

Patented Feb. 14, 1950

2,497,440

UNITED STATES PATENT OFFICE 2,497,440

HAND TRUCK

Lee R. Denny, Inglewood, Calif.

Application June 7, 1946, Serial No. 675,252

6 Claims. (Cl. 214—100)

This invention relates to a device which not only permits transportation of relatively heavy objects but enables ready lifting of the same for loading or stacking purposes.

It is an object of this invention to provide a trucking device having load lifting and stacking characteristics.

It is a further object of this invention to provide a hand truck with carrying features which are readily adjustable for loading or stacking purposes.

It is still a further object of this invention to provide a truck which enables the user thereof to raise for loading or stacking purposes, objects carried thereby without undue effort or strain.

Other objects of invention will become apparent from the following description in which Fig. 1 is a side elevational view of a hand truck embodying my invention.

Figure 1:
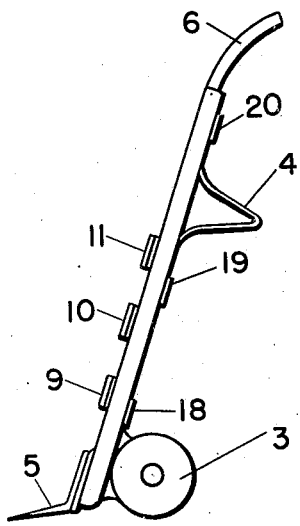
Figure 4:
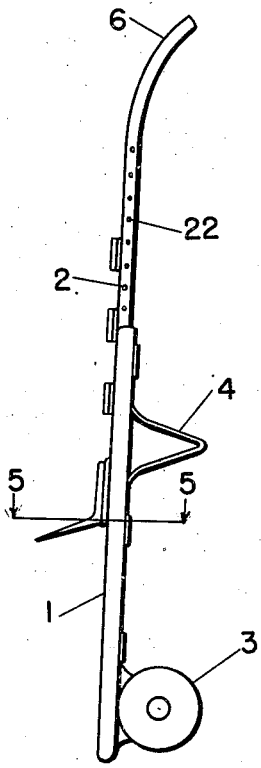
Fig. 4 is a side elevational view of the hand truck in extended loading or stacking position.
Figure 2:
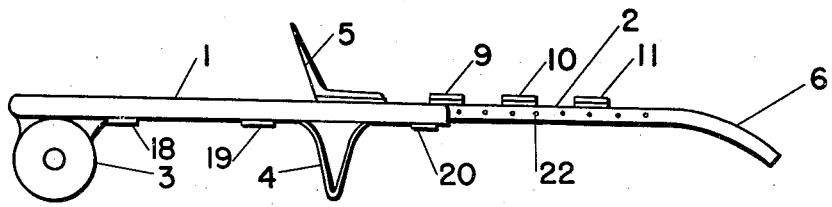
Fig. 2 is a side elevational view of the hand truck in extended position.
Figure 3:
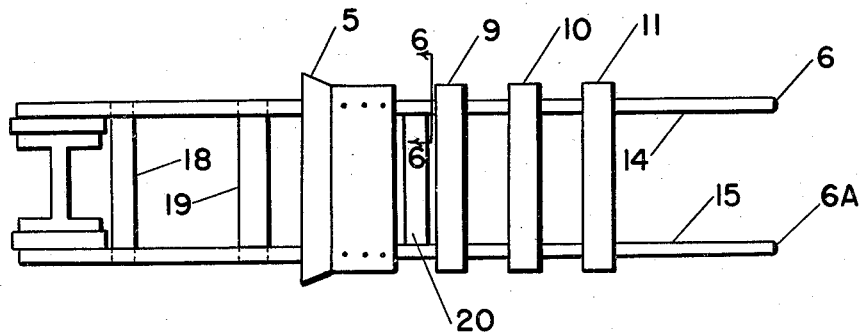
Fig. 3 is a top plan view of the hand truck of Fig. 2.
Figure 5:
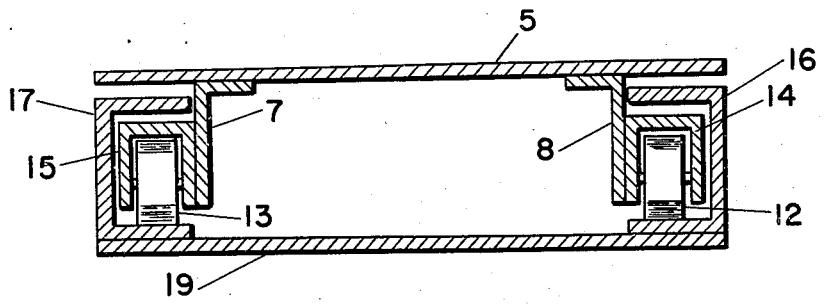
Fig. 5 is a cross sectional view along lines 5—5 of Fig. 4.

Referring to the drawings, and particularly Figs. 1 and 2, the hand truck embracing the preferred embodiment of my invention comprises a pair of frame members forming broadly an arm portion 1 and a second arm portion 2 adjustably positioned with respect thereto. Arm portion 1 has suitably connected thereto wheels 3 and a stand 4. Arm portion 2 has attached to the lower end thereof a load engaging and carrying part 5 and at the upper end thereof handles 6 and 6A of any suitable construction.

The frame constituting arm portion 2 is composed of a pair of inverted channel members 14 and 15 to which are attached by clip angles 7 and 8 and either by welding, riveting or other suitable means, cross members 9, 10 and 11 in addition to member 5. Handle portions 6 and 6A may be formed by suitably bending channel members 14 and 15 respectively or by attaching wooden handles thereto, or otherwise. Arm portion 1 is slidably mounted with respect to arm portion 2 by means of roller bearings 12 and 13 rotatably mounted by means of suitable bearings in channel members 14 and 15 respectively.

Arm portion 1 is formed of a pair of channel members 16 and 17 held in spaced relation by means of cross members 18, 19 and 20 suitably fastened thereto by means of welding, riveting or the like. Roller bearings 12 and 13 bear respectively on channel members 16 and 17. One pair of such bearings is shown.

Figure 6:
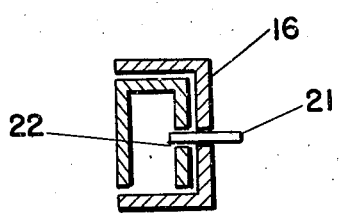
Fig. 6 is a cross sectional view along lines 6—6 of Fig. 3.
Figure 7:
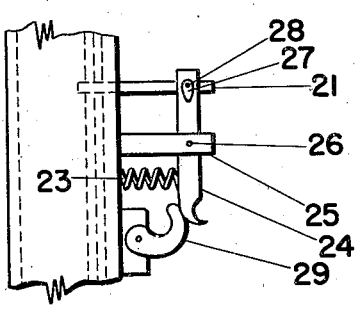
Fig. 7 is a top plan view of the latch mechanism shown in Fig. 6.

Arm portion 1 is held in adjusted position with respect to arm portion 2 by means of a hand latch more specifically illustrated in Figures 6 and 7 of the drawings. Referring to those figures, a locking bolt 21 is slidably mounted in member 16 and urged into locking engagement in opening 22 of member 14 by spring 23 one end of which bears upon member 16 and the other end of which bears against lever 24. Lever 24 pivotally mounted upon channel member 16 by means of a bracket 25 and pivot pin 26 has a loose connection with bolt 21 by means of a pin and slot arrangement 27 and 28 respectively. Lever 24 may be held with the bolt 21 in inoperative position by means of catch 29 suitably pivotally mounted on channel 16. Member 14 is provided with a sufficient number of openings 22 to enable holding frame 1 in any desired position with respect to frame 2 within the range of relative movement of the two frame members.

Obviously other latch means may be used including latch means operated by means attached to handle 6 or 6A if so desired. Likewise any suitable snubber or brake means common in the art may be used to hold wheel members 3 against movement while tilting the hand truck.

In operation a load is engaged with the truck in position as shown in Fig. 1. The load is then conveyed to a desired position as with an ordinary hand truck, or the load may be shifted for better control thereof during conveyance by unlatching frames 1 and 2 with the truck in the position shown in Fig. 2 and shifting frame 2 with the load thereon, to the desired position with respect to frame 1. Locking bolt 21 is then operated to hold the frame members in fixed relation. The truck may then be used for conveying or for stacking purposes.

With my device loads carried thereby may be lifted and/or stacked with facility and without strain or undue fatigue on the operator.

The frame members may be shifted within their range of movement to accommodate the height of the stack or the height to which the load is to be lifted and deposited. Furthermore when used only for trucking purposes, loads may be shifted with respect to the wheels of the truck so that the load will ride better on the truck.

Having described my invention, I claim:

1. A trucking and stacking device comprising an arm portion, wheel means connected to said arm portion adjacent the lower end thereof, a second arm portion provided with a load engaging and carrying part at the lower end thereof and a handle part at the upper end thereof, said second arm portion being adjustably connected to said first arm portion to extend said load-engaging part below the lower end thereof thereby to enable a load engaged by said part when said device is substantially upright to be shifted by arranging said device substantially horizontally and shifting said second arm portion with respect to said first arm portion a distance from the lower end of said first arm corresponding to the height to which the load is to be raised for loading or stacking purposes, whereby an upward force on said handle part will move said load about said wheels to loading or stacking position.

2. A device as recited in claim 1 in which said second arm portion is longer than said first arm portion to thereby enable obtaining a substantial lever action for loading or stacking purposes when said second arm portion is adjusted with respect to said first arm portion.

3. A device as recited in claim 1 and further providing a latching means for releasably fastening said two arms in adjusted position.

4. A trucking and stacking device comprising first arm means, second arm means movable with respect to said first arm means and provided at one end with a load engaging portion and at the other end with handle means, wheel means connected intermediate the ends of said first arm means for transporting said load and for serving as a fulcrum about which to move said truck from a substantially vertical load engaging position to a substantially horizontal load shifting position, means for releasably latching said first arm means to said second arm means whereby said load may be shifted to a preselected position on said first arm by a substantially horizontal force exerted on the handles of said second arm whereupon an upward force on said extended handles will move said load about said wheels and thence about the lower end of said first arm to loading or stacking position.

5. A trucking and stacking device comprising a first arm portion having a fulcrum and wheel means at its lower end, a second arm portion having load-engaging means at its lower end and handle means at its upper end, said second arm being longer than said first arm and slidably mounted thereon, said load-engaging means extending below said fulcrum to engage a load which can then be pivoted about said wheel means to a substantially horizontal position, shifted with respect to said first arm by an amount corresponding to loading or stacking height, and then pivoted forwardly and upwardly first about said wheels and thence about said fulcrum for loading or stacking purposes.

6. A device as recited in claim 5 in which said second arm is sufficiently long that its handle means extends beyond the upper end of said first arm with its load-engaging means extending below the lower end of said first arm.

LEE R. DENNY.

REFERENCES CITED

The following references are of record in the file of this patent:

UNITED STATES PATENTS

| Number | Name | Date |
|---|---|---|
| 127,897 | Kruse | June 11, 1872 |
| 389,383 | Hahn | Sept. 11, 1888 |
| 393,293 | Campbell | Nov. 20, 1888 |
| 533,605 | McQuiston | Feb. 5, 1895 |
| 552,696 | O'Neill | Jan. 7, 1896 |

FOREIGN PATENTS

| Number | Country | Date |
|---|---|---|
| 2,934 | Great Britain | Feb. 6, 1911 |
| 191,534 | Germany | Oct. 10, 1907 |